Sept. 13, 1938.     P. L. BETZ ET AL     2,130,175
SAFETY DEVICE FOR GAS HEATERS
Filed Aug. 30, 1935

Inventors
Paul L. Betz
Sebastian Karrer
By Cameron, Kerkam & Sutton
Attorneys

Patented Sept. 13, 1938

2,130,175

UNITED STATES PATENT OFFICE 2,130,175

SAFETY DEVICE FOR GAS HEATERS

Paul L. Betz, Baltimore, Md., and Sebastian Karrer, Washington, D. C., assignors to Consolidated Gas Electric Light and Power Company of Baltimore, Baltimore, Md., a corporation of Maryland Application August 30, 1935, Serial No. 38,654

1 Claim. (Cl. 158—117.1)

This invention relates to safety devices for gas burners as for example in the ordinary household gas heater for heating water or for other purposes.

Gas heaters of conventional types are subject at times to what is known in the art as a flashback. Such heaters usually comprise a gas burner, the gas being mixed with air in a mixing chamber adjacent the burner and the combustible mixture of gas and air being conducted to the burner where it is ignited by means of a pilot. At times the flame flashes through the burner ports and the gas burns in the chamber where the mixture of air and gas normally takes place. When such a flashback occurs, the gas often burns with insufficient oxygen resulting in the production of a relatively large quantity of carbon monoxide, and for this reason such devices are conventionally provided with flue connections. To prevent the danger incident to the production of carbon monoxide and to minimize the need for flue connections, it is desirable to provide safety means whereby the gas supply is shut off in the case of a flashback. In order that such devices may have maximum utility and advantage, particularly in the case of automatic appliances, it is further necessary that the safety means employed be of such nature as to restore the system automatically to normal operating condition after the gas has been shut off.

One of the objects of the invention is to provide means in combination with a gas burner which means operates automatically in case of flashback, first to shut off the gas supply and then to restore the system to operating condition.

Another object is to provide novel means responsive to thermal conditions existing in the mixing chamber for controlling the supply of combustible mixture to the burner.

A further object is to provide thermally controlled valve means for a gas burner which means is movable automatically to open or closed positions according to the thermal condition existing in the mixing chamber supplying the mixture of gas and air to the burner.

A still further object is to provide, in combination with a valve regulating the gas supply to a burner, a novel thermostatic means exposed to heat resulting from a flashback for moving the valve to closed position.

Another object is to provide, in combination with a valve regulating the gas supply to a burner, controlling or actuating means for regulating the position of the valve which means are thermally controlled so that said valve is closed automatically in case of flashback, but said means are thereafter restored to normal operating condition for regulating the position of the valve.

Another object is to provide, in combination with an electrically operated valve controlling the gas supply to a burner, an energizing valve circuit having thermally responsive regulating means which are subjected to the temperature in the mixing chamber supplying the mixture of gas and air to the burner and are arranged to control said circuit in such a way as to cause the closing of the valve in the event of flashback.

One embodiment of the invention has been illustrated in the accompanying drawing, but it is to be expressly understood that said drawing is for purposes of illustration only and is not to be construed as a definition of the limits of the invention, reference being had to the appended claim for this purpose. In said drawing:

Generally speaking, the invention embodies a thermally responsive element which is subjected to temperature conditions existing in the mixing chamber wherein the mixture of gas and air takes place. Since in the event of flashback the mixing chamber is subjected to abnormal temperature, a thermally responsive element subjected to this temperature can be employed in the event of flashback to regulate a suitable gas control valve. This valve may be either a special safety valve, or in an automatically operating system the supply valve of the system may be controlled by said thermally responsive means in addition to the normal control thereof by the usual or any suitable automatic devices. The thermally responsive element is located in the mixing chamber, and any suitable form of thermostatic device may be employed depending upon conditions of use, such as bimetallic members, collapsible and expansible members, etc.

Further, the means whereby the valve is actuated or controlled by the thermally responsive means is here shown as electrical of standard type used with the control system to be employed for the heater. With such an electrical system, various control devices and circuits may be employed, and the particular manner in which a device embodying the present invention is to be used will depend on the nature of such control systems. For example, in systems embodying electrically controlled or operated valves, the device may be connected in series in the valve circuit. On the other hand where an electrical valve control system is employed which embodies other valve control devices such as relays, the flashback control may be utilized to prevent the normal operation of such control devices and in turn of the supply valve.

Figure 1:
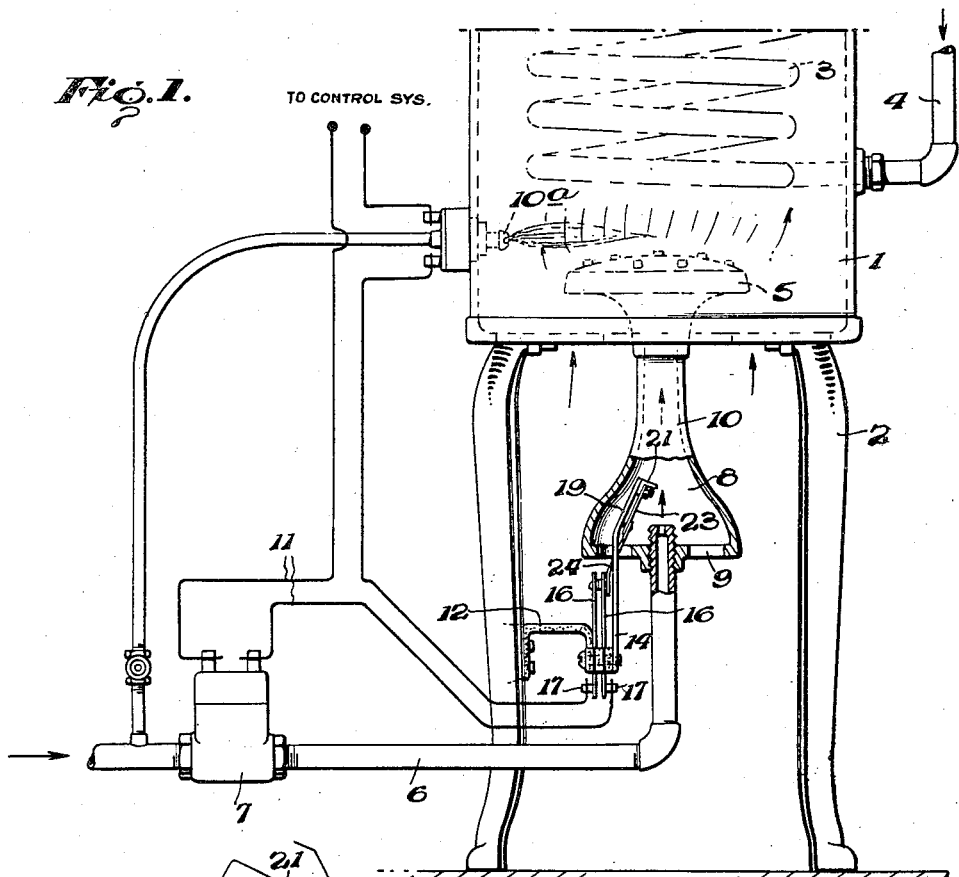
Fig. 1 is a diagrammatic illustration of a gas water heater and connections thereto which is equipped with electrical control means embodying the invention.
Figure 2:
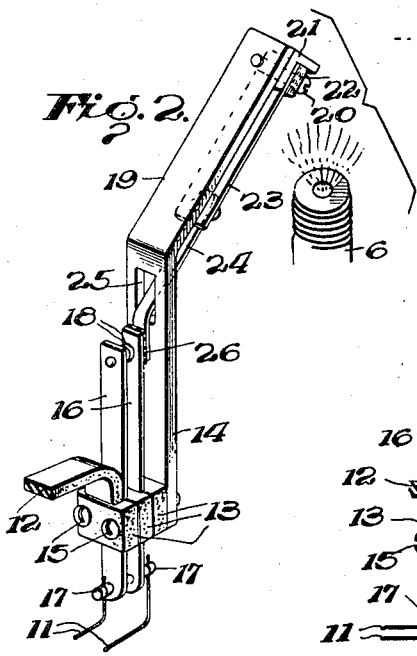
Fig. 2 is a perspective view of the thermally responsive control element of Fig. 1.
Figure 3:
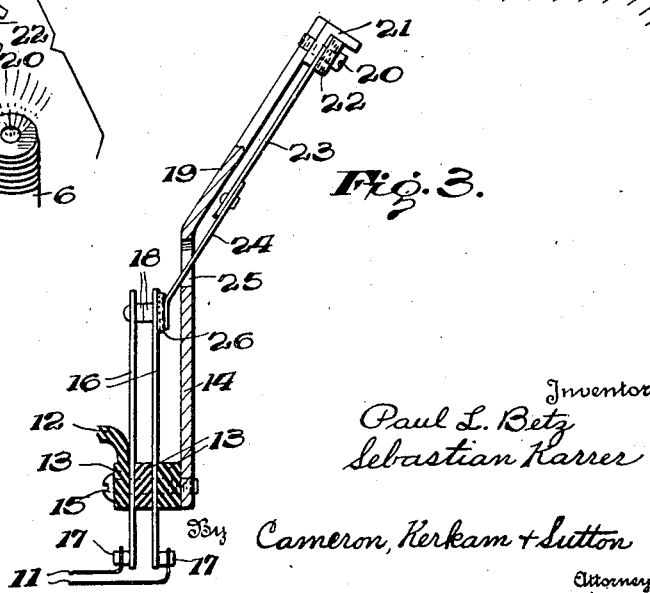
Fig. 3 is a sectional view of said thermally responsive element.

One illustrative embodiment of the invention has been shown in the drawing. Figs. 1, 2 and 3 illustrate the embodiment of the invention applied to a heating system which is electrically controlled, the thermally responsive element being located in the mixing chamber. Referring to Fig. 1, a gas water heater of any suitable type is conventionally illustrated, this heater comprising a shell 1 supported on legs 2 and enclosing a coil 3 having an inlet connection 4. Water passing through the coil is heated by means of the gas burner 5 supplied with gas through pipe 6 in which is incorporated a control valve 7. As indicated above, this valve 7 may comprise the main supply valve of the system, which in an automatic system is controlled by known or any suitable devices, or it may comprise a special safety valve which is closed only in the event of a flashback. When the valve is open, gas passing through the pipe 6 enters a mixing chamber 8 which, as shown, is of conventional form and in which the gas is mixed with air entering said chamber through one or more ports 9. The combustible mixture of gas and air passes from the mixing chamber to the burner 5 through a conduit 10, where it is ignited by the usual or any suitable pilot device 10a. It will be understood that the particular design and details of the system as thus far described constitutes no part per se of the present invention.

As shown in Fig. 1, the valve 7 is electrically controlled through the leads 11. Electrically operated valves of various types are known and can be obtained on the market. One suitable type of valve comprises an operating electromagnet which holds the valve open against spring tension during operation of the system, the spring restoring the valve to closed position when the electromagnet is deenergized, and this type of valve is assumed in the following description. In the event that valve 7 is the main supply valve of an electrically controlled automatic system, the supply of current through the leads 11 to the valve will be controlled by any suitable automatic system which may be connected to the leads 11 in any suitable manner. Since the details of such systems constitute no part of the present invention, the control circuits are not shown or described herein.

The details of construction of a suitable thermally responsive device comprising a bimetallic thermostat are shown in Figs. 2 and 3. The thermally responsive device may be mounted in any suitable manner and as shown is supported by a bracket 12 secured to one of the legs 2 of the heater. As shown in detail in Figs. 2 and 3, the device comprises a plurality of blocks of any suitable material 13 and a support 14 which are assembled by means of the screws 15. The blocks 13 support a pair of resilient arms 16 of conductive material provided at one end with suitable terminals 17 to which the leads 11 are connected and at the other end with contact members 18; said arms being insulated from the supporting blocks in any suitable way. If the blocks are of conductive material such as metal, interposed strips of mica or other insulation can be employed, or the blocks themselves may be made of insulating material.

As stated above, the contacts 18 can be utilized to control a circuit which, either directly or indirectly through other control devices, causes the valve to be maintained open to permit the flow of gas to the burner. In the form shown, for example, the contacts 18 are in series with the valve and the arms 16 are so arranged that they tend to maintain the contacts 18 open. When the contacts are held in closed position as shown in Fig. 3 and as described hereinafter, they complete the circuit of the valve 7, and when said contacts are permitted to open, the circuit of the valve is interrupted, the electromagnet is deenergized, and the valve closes, shutting off the supply of gas.

The support 14 is provided with an angularly extending arm 19 which passes through one of the air ports 9 and thus extends within the mixing chamber 8. Secured to the upper end of the arm 19 in any suitable manner, as by means of a screw 20, are an L-shaped block 21 and a cooperating block 22 both of which are preferably of metal having relatively high heat conductivity. A suitable thermostatic element in the form of a bimetallic strip 23 is secured between the blocks 21 and 22. An arm 24 secured to the end of the bimetallic strip 23 passes through a guide slot 25 in the support 14 and is adapted through any suitable mechanical connection to operate the contacts 18. Thus said arm 24 may be arranged to move one of the arms 16 to and fro whereby said contacts are both opened and closed by the arm 24, but where said arms 16 are resilient as described above, it is sufficient to provide arm 24 at its end with a block 26 of suitable insulating material which bears against one of the resilient arms 16 and normally maintains the contacts 18 closed as shown in Fig. 3.

Under normal conditions of operation of this system, the temperature within the mixing chamber 8 is relatively low and the contacts 18 are maintained closed by the bimetallic strip 23 so that they have no effect on the operation of the valve 7 by any control system which it is desired to employ. However, in the event of a flashback, the temperature within the mixing chamber is increased by reason of the gas flame which burns at the end of the supply pipe 6 within the chamber. The thermostatic element, which is preferably located close to this flame, is heated thereby and bends in such direction as to move the arm 24 and the block 26 away from the resilient arm 16. Said arms thereupon spring apart by virtue of their own resilience, opening the contacts 18 and interrupting the circuit to the valve 7 which then closes and shuts off the gas supply. However, as soon as the temperature within the mixing chamber returns to normal, which ordinarily takes place within a short interval, the bimetallic strip 23 cools off and moves the arm 24 back until the contacts 18 are again closed and the system is thereby restored to condition for operation in normal manner through the control devices which are provided for the system.

It will be perceived that the invention provides a safety device which is automatically operative to stop the flow of gas to the burner in the event of a flashback and which is also automatically operative thereafter to restore the system to normal condition for operation by any of the usual control means that may be provided. The invention thus has the advantage of providing an effective safety device while at the same time interfering in no way with the normal or any desired control or operation of the heating system, except in the event of flashback and only so long as an abnormal temperature prevails. The danger incident to the production of carbon monoxide in the event of flashback is eliminated by the invention, and in the case of automatically controlled and operated systems, flue connections are unnecessary. These results are accomplished by a simple, inexpensive device which is at the same time dependable and reliable in operation.

In the case of an automatic or semi-automatic system, the feature of restoring the system to normal operative condition in an automatic manner is particularly advantageous. Safety devices which merely shut off the supply of gas, as by the fusing of a metallic link or some equivalent operation, usually require the services of a skilled mechanic in order to restore the system to operating condition, which results in the system being inoperative and useless for considerable periods of time. Devices embodying the present invention, however, incorporate the desired safety feature in the system in an effective and dependable operation, while at the same time they permit renewed operation of the system immediately after the flashback has been extinguished and without attention or manual adjustment. In the event of flashback, the interruption of service is, thereby, only temporary.

While one embodiment of the invention has been described and illustrated in the drawing, it is to be expressly understood that the invention is not limited thereto, as changes may be made in the form, details of construction and arrangement of the various parts, while equivalent thermostatic devices may be substituted for that described and illustrated, all without departing from the spirit of the invention. Thus, any suitable type of thermostatic element may be used in place of the bimetallic strip of Figs. 1-3 to operate the electric contacts involved in these systems. Further, the manner of installation of the thermostatic element and the operating mechanism actuated thereby may be varied widely. Reference is, therefore, to be had to the appended claim for a definition of the limits of the invention.

What is claimed is:

In a device of the class described, the combination of a burner, means for mixing gas and air and supplying the mixture to said burner, an electrically controlled gas supply valve, an energizing circuit for said valve, a pair of contacts controlling said circuit and disposed outside said mixing means and not subject to heat therefrom, a frame carrying said contacts and having an arm extending into said mixing means, and a bimetallic element carried by said arm within said mixing means and exposed to heat from a flame therein, said element being operatively connected with said contacts to operate the same.

PAUL L. BETZ.
SEBASTIAN KARRER.